United States Patent

Marshall et al.

[15] 3,638,636
[45] Feb. 1, 1972

[54] AIR HEATER

[72] Inventors: William A. Marshall; Bernard Paul Lunkwicz, both of Centralia; Henry Meresz, Wheeling, all of Ill.

[73] Assignee: Lear Siegler, Inc., Santa Monica, Calif.

[22] Filed: Jan. 22, 1970

[21] Appl. No.: 4,881

[52] U.S. Cl. .................................126/110 R, 126/116 R
[51] Int. Cl. ................................................F24h 3/06
[58] Field of Search ...............126/91, 99, 110, 110 B, 116, 126/116 B; 165/122

[56] References Cited

UNITED STATES PATENTS

| | | | |
|---|---|---|---|
| 1,927,174 | 9/1933 | Jones | 126/116 |
| 2,808,047 | 10/1957 | Jaye et al. | 126/110 X |
| 2,923,349 | 2/1960 | Marble et al. | 126/116 X |
| 3,105,485 | 10/1963 | Lucas | 126/110 |
| 3,294,082 | 12/1966 | Norris | 126/110 X |
| 3,324,845 | 6/1967 | White | 126/116 |

Primary Examiner—Charles J. Myhre
Attorney—Christie, Parker & Hale

[57] ABSTRACT

A plurality of adjacent shell-type heat exchange shells are disposed in a furnace casing above a blower with an air passage between adjacent heat exchange shells. Each heat exchange shell includes a lower combustion chamber which opens into an intermediate heat exchange section, and a flue gas collector duct above the heat exchange section connected to a vent. Gas burners are disposed in each combustion chamber to create products of combustion which flow upwardly through each heat exchange shell. The walls of each heat exchange section are convoluted to produce a serpentine passageway with considerable heat transfer surface for the rising combustion gases. A baffle located at the inlet to the collector duct produces even gas flow through the heat exchange section and diverts gases to heat the walls of the duct. Each heat exchange shell is constructed of sheet metal and comprises a pair of complementary half-shells welded together such that an outer peripheral seam is formed. The seam follows the line of the convoluted walls of the heat exchange section to reduce thermal stresses. The heat exchange shells are mounted in the casing with the use of a floating joint to enable vertical expansion of the shells.

17 Claims, 5 Drawing Figures

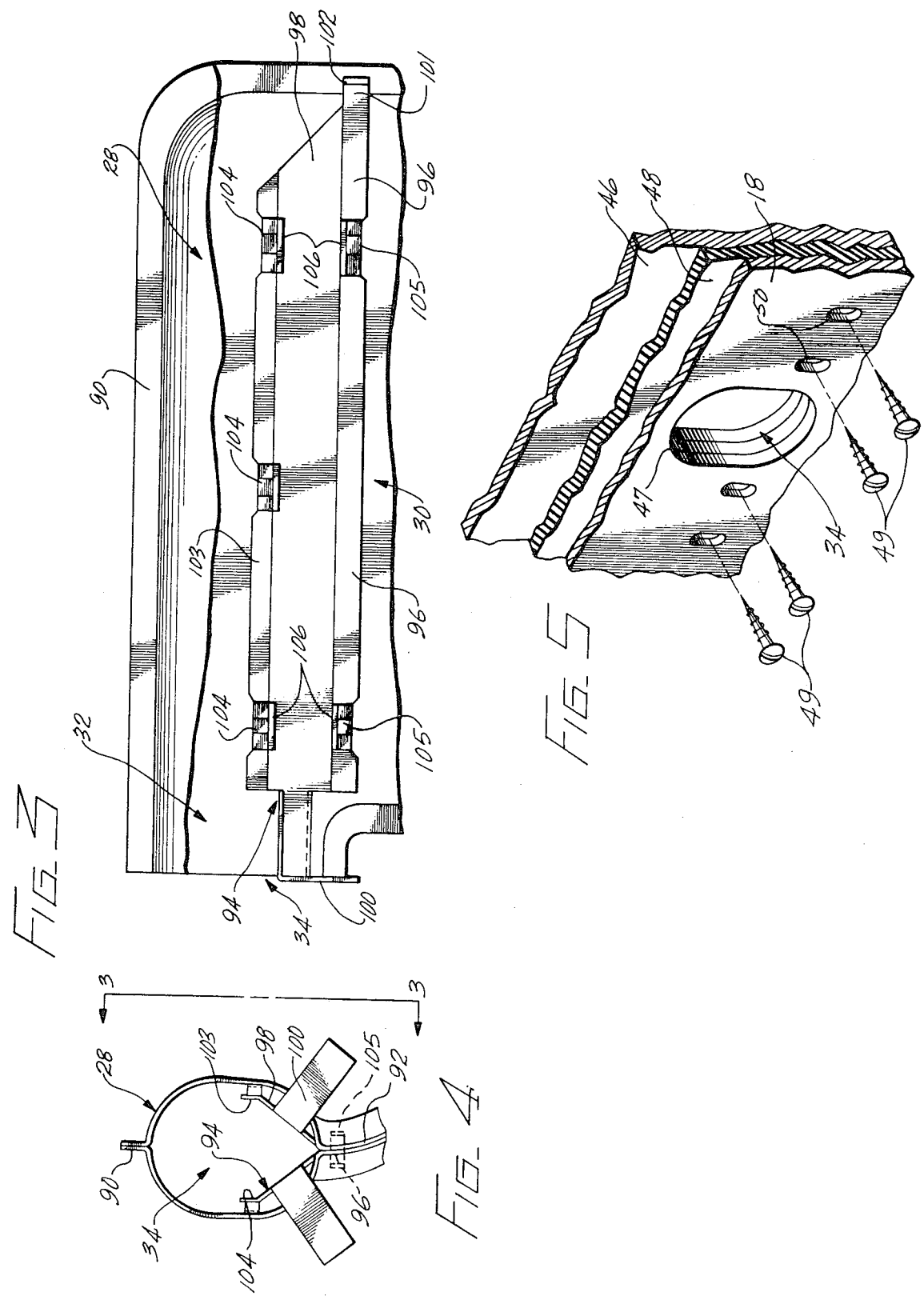

3,638,636

1

AIR HEATER

BACKGROUND OF THE INVENTION

This invention relates to improvements in air heaters, and more particularly to an improvement in heat exchange shells for use in air furnaces.

Forced air heating furnaces typically include a plurality of adjacent shell-type heat exchange units mounted above a blower. Burners are disposed in a combustion chamber at the bottom of each heat exchange shell. Products of combustion flowing upwardly through each shell transmit heat to air passing between the shells. A flue gas collector duct at the top of each shell is connected to means for venting products of combustion. This type of furnace is typically used in home heating.

Size is an important consideration in domestic furnaces because reducing the size of a furnace eases installation and increases available living space. The overall size of a furnace can be reduced by effective use of its heating surfaces, and this is accomplished by providing a heat exchange shell construction that maximizes the transfer of heat energy from the combustion products to the walls of the shell and therefore to the air passing outside the shell. It has long been recognized that favorable heat transfer characteristics result from a scrubbing action between upwardly moving combustion products and the walls of the shell.

Some previous heat exchanges have been ineffective because the structure of their heat exchange shells has tended to cause rising combustion gases to "channel" in a direct path toward the flue gas collector duct outlet as a result of draft conditions associated with the outlet. This channeling produces a "thermal short circuit" and reduces the effectiveness of the heat exchanger surface. Specifically stagnant combustion products near the collector duct cause products of combustion to pass through the heat exchange shells before the desired amount of heat energy has been extracted from them.

The usual heat exchange shell is constructed by welding together a pair of convoluted complementary half-shells, each of which is formed of metal stamping with a planar seam around its outer perimeter. The seam line of these structures is therefore substantially shorter than the walls of the heat exchange section. As a result, cycling vertical expansion and contraction of the walls during heating and cooling differs from the expansion and contraction of the seam. This creates cycling thermal stresses in the shell that may result in metal fatigue and a consequent reduction in the service life of the furnace.

SUMMARY OF THE INVENTION

The furnace contemplated by this invention provides an improved heat exchange shell construction which permits effective use of its heat exchange surfaces, thereby allowing a reduction in the overall size of the furnace. The heat exchange shell of this invention is designed so that metal stresses are at a minimum during the heating-cooling cycle, and, consequently, the service life of the furnace is improved.

The heat exchange shell contemplated by this invention includes a combustion chamber adapted to receive a relatively long burner of the type typically used in home furnaces and operated on natural or liquefied petroleum gas fuels, for example. A relatively long and narrow slot or opening extends along the top of the combustion chamber to allow for the escape of combustion gases. The heat exchange section of the shell is integral with the combustion chamber and is formed by walls extending upwardly from the combustion chamber's opening. The walls define a relatively long and narrow upright passage for the products of combustion emanating from the combustion chamber. Preferably, the walls of the heat exchange section are convoluted to provide a surpentine vertical passageway to increase heat transfer area. A substantially horizontal flue gas collector duct is integral with the upper part of the heat exchange section. The collector duct has an outlet at one end and a relatively long and narrow inlet communicating with the passage in the heat exchange section.

The upwardly extending walls of the heat exchange section preferably converge slightly toward the collector duct to compensate for specific volume decrease as heat is extracted from the ascending combustion gases. That is, the gradually reduced cross-sectional area of the heat exchange section tends to maintain a constant velocity of combustion gases moving upwardly through the shell to maximize the heat transfer between the gases and the heating surfaces. Preferably, the walls of the heat exchange section have relatively shallow convolutions between the combustion chamber opening and the collector duct inlet. The convolution of the heat exchange section of this invention permit good contact with the walls of the shell, because the lateral deflection of the ascending combustion gases is large enough to impart desired scrubbing action to the walls, yet shallow enough to permit contact with substantially the entire available heat exchange surfaces.

Baffle means extend lengthwise along the collector duct inlet and are disposed substantially centrally relative to the inlet. The baffle means products uniform flow of the upward flowing gases through the heat exchange section, thereby preventing thermal short circuiting of combustion gases. The baffle means also diverts ascending combustion gases along the walls of the collector duct to prevent vortexing of the gases in the collector duct, thereby increasing heat transfer from the duct walls to the air passing outside the duct. Preferably, the baffle means extends substantially the entire length of the collector duct inlet and has a substantially uniform cross-sectional area transverse to the upward flow of combustion gases through the inlet. In the preferred form of the invention, the baffle means includes an elongated, vertically oriented dividing fin disposed lengthwise with reference to the collector duct inlet. Division is preferably accomplished by a pair of elongated gas diverting members integral with the upper edge of the fin which diverge upwardly into the collector duct close to the walls thereof.

The heat exchange shell is preferably formed by a pair of sheet metal stampings in the form of complementary half-shells welded together such that an outer peripheral seam is formed. The resultant shell is economic to fabricate because the metal stampings are rapidly and inexpensively formed and assembled. The peripheral seam line follows the line of the convoluted walls of the heat exchange section to reduce thermal stresses.

To provide a large number of shells in a given lateral space, it is preferred to have an expanded section at the front of the combustion chambers. These expanded sections, in assembly, abut corresponding sections of neighboring shells. The remaining portion of each combustion chamber is narrower than its respective expanded section to provide for airflow between the shells. Air-diverting means are secured to the inner walls of the furnace casing and cooperate with the convolutions of the adjacent heat exchange shell to channel the ascending air close to the walls of the shell. The expanded sections have a transverse opening for flame carryover means which communicate adjacent combustion chambers to avoid the necessity of a plurality of pilots. In its assembled form the shells are disposed in a side-by-side relation in a furnace casing and supported therein by a faceplate which is disposed slightly rearwardly of the front of the casing. The combustion chambers open into the space between the faceplate and the front of the casing for the aspiration of combustion air. Each collector duct outlet opens near the top of the casing into a flue gas collection space formed by a draft diverter assembly which spans the faceplate. The collection space communicates with a flue stack for the ultimate discharge of flue gases. A draft produced through the collection space aids removal of these gases.

To avoid thermal stresses and expansion noises, a floating collar plate is transversely disposed relative to the shells to hold each collector duct outlet. This collar plate is mounted to the faceplate such that it can move vertically in response to thermal expansion of the heat exchange shells. Preferably, insulation is disposed between the collar plate and the faceplate to prevent the latter from becoming excessively hot. Thus, the floating header plate allows the free expansion of the heat exchange shells within the casing without imposing expansion forces upon the confining casing.

These and other features, aspects and advantages of the present invention will become more apparent from the following description, appended claims and drawings.

BRIEF DESCRIPTION OF THE DRAWINGS

FIG. 3 is an elevation view, partly broken away, taken along line 3—3 of FIG. 4;

FIG. 4 is an enlarged elevation view of the apparatus within the circle 4 of FIG. 1; and FIG. 5 is an enlarged fragmentary perspective view of the structure shown within the circle 5 of FIG. 2.

DETAILED DESCRIPTION OF THE PREFERRED EMBODIMENTS

Figure 1:
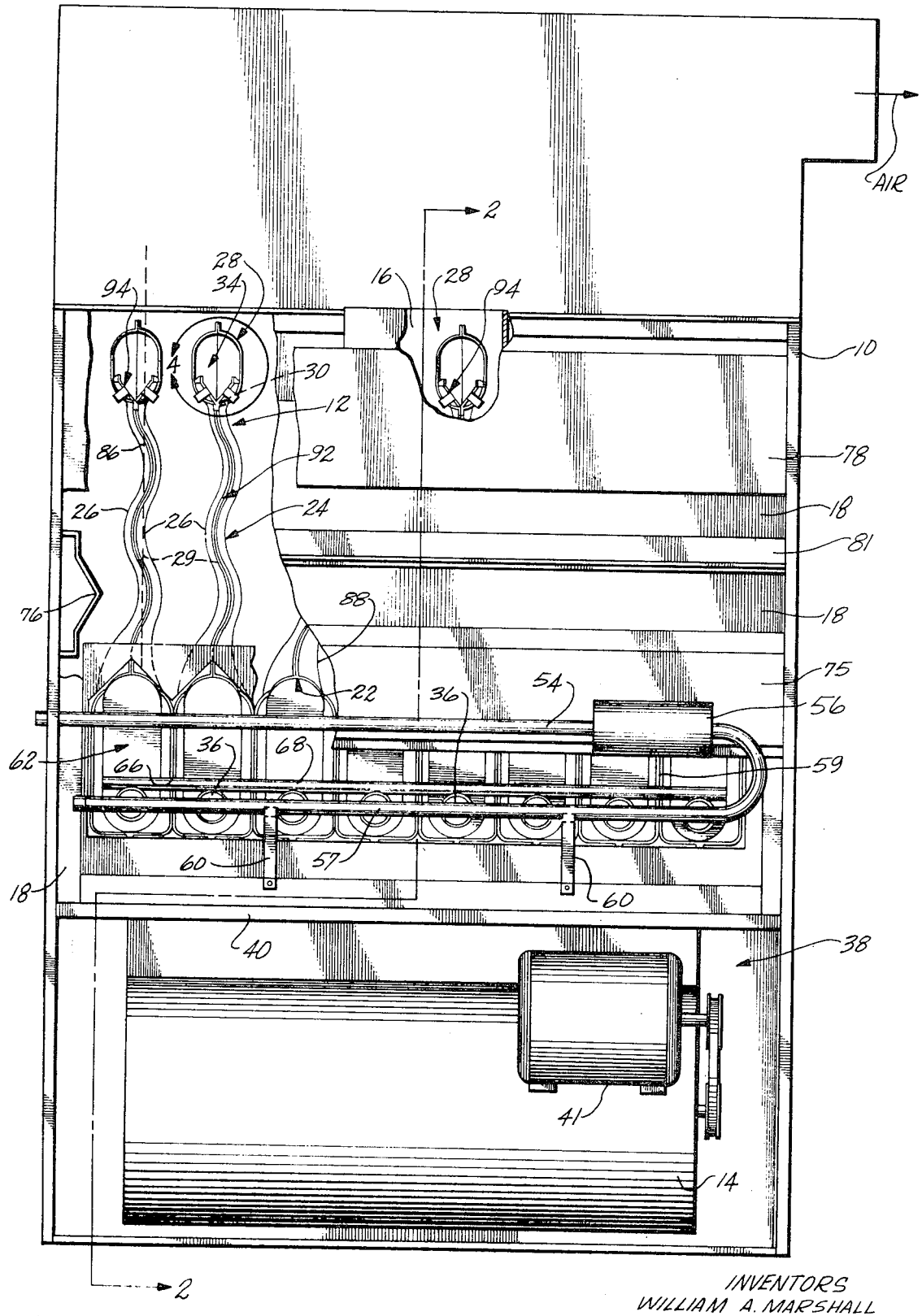
FIG. 1 is a frontal elevation, partly in section and partly broken away, showing a preferred air heater according to the present invention.
Figure 2:
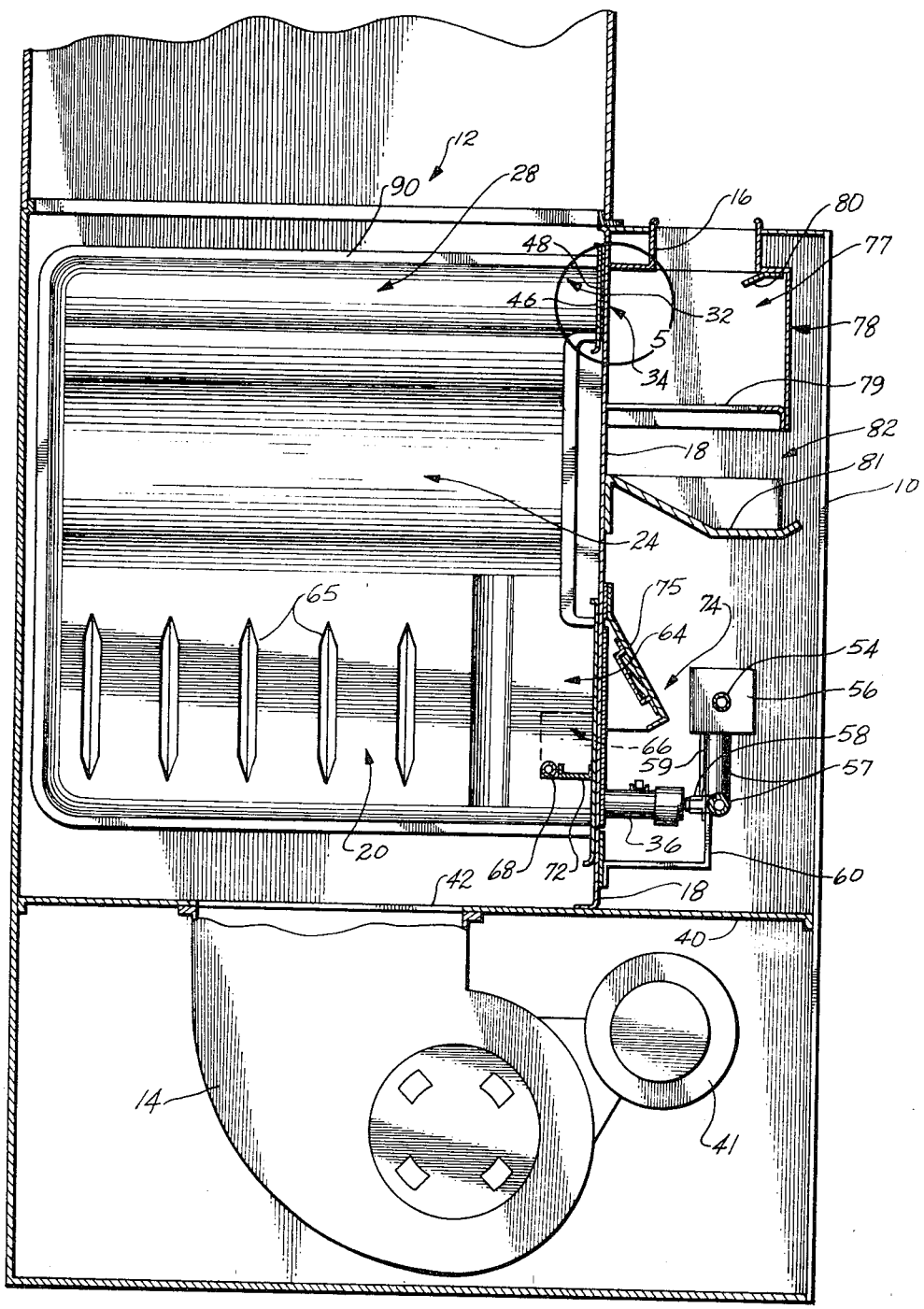
FIG. 2 is a side elevation view, partly in section and partly broken away, taken along line 2—2 of FIG. 1.

Referring to the drawings, the improved air heater of this invention includes a thin-walled outer casing 10, and a plurality of adjacent heat exchange shells 12 located inside the casing above induction blower 14. A tubular flue stack 16 communicates with the upper interior portion of the casing. An upright faceplate 18 is disposed transversely relative to casing 10 so as to front the bundle of heat exchange shells.

Each heat exchange shell generally includes an elongated hollow combustion chamber 20 with a relatively long and narrow opening 22 along its top. An upright heat exchange section 24, integral with the combustion chamber, is formed of a pair of closely spaced-apart, convoluted walls 26 extending upwardly from opening 22 to a horizontally disposed, elongated, hollow, flue gas collector duct 28. The convolutions of walls 26 are congruent with one another such that a relatively long and narrow vertical serpentine passage 29 extends upwardly from the combustion chamber to the flue gas collector duct. A relatively long and narrow inlet 30 at the bottom of collector duct 28 communicates with vertical passage 29. The collector duct terminates in an outwardly projecting extension 32 with a frontal outlet 34 opening in a substantially vertical plane.

An elongated, tubular burner 36 is disposed in each combustion chamber and connected to a gas supply. The air heater of this invention includes a lower chamber 38 below heat exchange shells 12 defined by a horizontal panel 40. Induction blower 14 and an electric drive motor 41 are mounted in chamber 38. The blower circulates air upwardly through the volume surrounding the heat exchange shells via opening 42 in panel 40.

An elongated, tubular burner 36 is disposed in each combustion chamber and connected to a gas supply. The air heater of this invention includes a lower chamber 38 below heat exchange shells 12 defined by a horizontal panel 40. Induction blower 14 and an electric drive motor 41 are mounted in chamber 38. The blower circulates air upwardly through the volume surrounding the heat exchange shells via opening 42 in panel 40.

Faceplate 18 extends upwardly from the panel and slightly inwardly from the front of the casing. Collector duct extensions 32 are disposed in holes (not shown) in a vertically disposed collarplate 46 located to the rear of and adjacent to faceplate 18 away from the front of the casing. As seen best in FIG. 5, holes 47 in faceplate 18 are located adjacent to the vertical opening defined by each collector duct extension 32. Insulation 48 is disposed between collarplate 46 and faceplate 18 to prevent the latter from overheating and to provide an air seal between faceplate 18 and collarplate 46. Fasteners 49 extend through vertically oriented slots 50 in faceplate 18, through insulation 48, and are secured in holes (not shown) in collarplate 46. The slots allow collarplate 46 to move vertically in response to expansion resulting from the temperature of heat exchange shells 12. Thus, collarplate 46 floats with respect to faceplate 18.

Each burner 36 extends for substantially the entire length of each combustion chamber 20 to provide for even distribution of the products of combustion through the shells. Gasline 54 supplies gas to control valve 56. The outlet of control valve 56 is connected to manifold pipe 57 which supplies gas to each burner 36. The burners extend outwardly from their respective combustion chamber to a point flush with the side of manifold pipe 57. Each burner is coupled to manifold pipe 57 by a respective orifice fitting 58 extending laterally from the manifold pipe into the frontal portion of each burner. The orifice fittings control the flow of gas to each burner. Control valve 56 controls the volume of gas admitted to the burners and to pilot line 59 leading from control valve 56 to a pilot burner head (not shown) located in a centrally disposed combustion chamber. A pair of upwardly extending brackets 60 secured to faceplate 18 support manifold pipe 57. Each combustion chamber 20 approximate its frontal opening 62 is expanded for abutting connection to an adjoining heat exchange shell. The combustion chamber narrows along its remaining length from expanded section 64. The narrow section between adjacent heat exchange shells provides a passage for air from blower 14. A plurality of narrow, vertically oriented, outwardly extending ribs 65 are stamped in the walls of the combustion chamber's narrow section to prevent material movement of the walls. Transverse holes 66 disposed in the walls of expanded section 64 are adapted to receive an elongated flame carryover tube 68 mounted transversely on burners 36. The pilot burner head (not shown) of pilot line 59 is located below carryover tube 68 and, in use, the pilot burner head initiates a flame over the carryover tube to ignite the burners. The heat exchange shells are secured together during their expanded sections by welding the edges of opening 66. The burners 36 are secured to the bottom of an elongated, channel-shaped tie bar 72 disposed transversely in holes 66. Each burner is maintained in a rigid position centrally of its respective combustion chamber by a support (not shown) at its rear end.

Each combustion chamber opens into a space 74 in front of faceplate 18 for the aspiration of air. An elongated, flat baffle plate 75 extends across the faces of the combustion chamber openings to monitor the amount of aspirated air.

An elongated, horizontally disposed diverter 76 having a V-shaped cross-sectional configuration is secured to the inner wall of the casing adjacent one of the heat exchange shells. The diverter's inward projection cooperates with the convoluted wall of the adjacent heat exchange shell to channel ascending heated air close to the walls of the shell to increase the amount of heat extracted from the shell.

Collector duct outlets 34 open into collection chamber 77 which is enclosed by a boxlike draft diverter 78 which spans faceplate 18 directly below flue stack 16. A U-shaped draft diverter rollout shield 79, formed from three elongated angle members connected at their ends, is welded to the inside of the draft diverter body at its bottom. An elongated, angled draft diverter baffle 80 is welded to the inside of the draft diverter at its top adjacent to the opening into flue stack 16. In use, a draft is produced through draft diverter 78 to aid removal of flue gases through flue stack 16. Draft diverter baffle 80 prevents stray currents of flue gases from flowing through draft diverter 78. An elongated angled draft plate 81 is secured to faceplate 18 below draft diverter 78 so that it extends transversely relative to the heat exchange shells. An open space 82 is left between the lower edge of draft diverter 78 and the upper surface of draft plate 81. This open space together with the configuration of draft plate 81 provides for dilution air to dilute the produces of combustion from the heat exchange shells in chamber 77 for discharge out flue stack 16. This dilution stabilizes the pressure at the outlet of the flue gas collectors. It also provides an outlet for products of combustion and air if a downdraft occurs.

As is most clearly depicted in FIG. 1, walls 26 of each heat exchange section are convoluted to provide a serpentine vertical passageway for ascending products of combustion. The shape of the heat exchange section is preferred because it obtains a scrubbing action between combustion gases and walls 26 which tends to produce a favorable exchange of thermal energy from the gases to the heating surfaces and therefore to the air passing outside the shell. The narrow dimension of the heat exchange section's vertical passage 29 progressively decreases as collector duct 28 is approached. This decrease in effective cross-sectional area for combustion gas flow compensates for the gases' normal decrease in specific volume as they cool during their upward flow. By this compensation, the average gas velocity within passage 29 is more or less constant between combustion chamber 20 and collector duct 28. Thus, more gas molecules contact walls 26 than would come in contact with a straight passageway, and as a result, a greater proportion of heat is extracted from the combustion gases. The convolutions of walls 26 are designed to slightly permit passage of a vertical plane 86 through the convolutions from combustion chamber 20 to collector duct 28. This geometry effects sufficient lateral deflection of combustion gases to provide the desired scrubbing action on walls 26 while allowing for sufficient upward flow of gases through passage 29 so that contact is made with a substantial portion of the available heat transfer surfaces.

Preferably, a lower section 88 of wall 26 is bowed outwardly adjacent to opening 22 to insure flexing of the metal away from the flue gases extending through opening 22, thereby avoiding impingement and localized heating from the flue gases. The intense heat developed at the bottom of the heat exchange section near combustion chamber opening 22 normally causes thermal fatigue and failure of heat exchanger surfaces in this area if there is substantial contact with substantial gases.

The heat exchange shell of this invention is preferably fabricated from a metal-stamping process adapted to form a pair of complementary half-shells having a lateral rim 90 spanning their outer perimeters. The half-shells are secured together by mating outer rims 90 and welding the shells together about these rims so that a convoluted outer peripheral seam 92 is formed along the outside of heat exchange section 24. Convoluted seam 92 follows the curvature of convoluted walls 26 so that the length of the seam from the bottom to the top of the heat exchange section is substantially equal to the distance traversed by walls 26. The walls of the heat exchange section normally expand and contract in a vertical plane in response to temperature variations. The serpentine seam 92 is free to expand and contract with the walls of the heat exchange section. This avoids creation of thermal stresses or fractures commonly experienced when a seam line is substantially shorter than the walls of its respective heat exchange section.

As best seen in FIGS. 3 and 4, an elongated flue baffle 94 is mounted lengthwise in collector duct 28. The baffle includes an elongated, relatively thin, vertically oriented gas flow dividing fin 96 disposed centrally within collector duct inlet 30. In the preferred form of the invention, dividing fin 96 actually comprises a pair of mating structural members welded to one another, with each member having an elongated, relatively thin, upwardly diverging gas-diverting member 98 integral with its upper edge extending upwardly into the interior of the collector duct. Preferably, flue baffle 94 extends substantially the entire length of the collector duct. The front edge of each gas diverting member 98 has a downwardly divergent indexing tab 100 secured to the outer wall of collector duct extension 32 below frontal outlet 34. A tail fin 101 integral with the rear of dividing fin 96 extends into a slightly oversized slot 102 formed between the mating halves of the heat exchange shell. Indexing tabs 100 provide frontal means of support for baffle 94, and tail fin 101 and slot 102 cooperate to insure that the baffle is properly oriented in collector duct 28 while permitting the baffle to expand freely relative to the heat exchange shell. A substantially vertical flange 103 is integral with the upper edge of each gas-diverting member 98. A plurality of spaced-apart angled standoff tabs 104 integral with each vertical flanges 103 project laterally outwardly from their respective flanges for abutment against the inner walls of the collector duct. Similarly, a pair of standoff tabs 105 are struck out from the front and rear sides of the structure members comprising vertical dividing fin 96. A longitudinal slot 106 is blanked out of the walls of the flue baffle adjacent to each standoff tab so that the tabs can be easily and uniformly struck out from the sides of the baffle. The standoff tabs 104 and 105 provide means of longitudinal support for baffle 94, and are capable of slight movement relative to the walls of collector duct 28 during thermal expansion to avoid thermal stresses being imparted to the flue baffle. The standoff tabs also allow ascending combustion gases to bypass the baffle as they are diverted along the inner walls of the collector duct.

In use, flue baffle 94 prevents thermal gas channeling in the heat exchange section. The flue baffle produces uniform gas flow through vertical passage 29 and also diverts the combustion gases along the walls of the collector duct. Because of the shape of convoluted heat exchange section 24, ascending flue gases are directed to the left side of collector duct 28 (when viewing the face of the furnace in FIG. 1) as they emerge from the heat exchange section into the collector duct. Ordinarily, this causes vortexing of the flue gases within the collector duct and thereby increases the energy losses in this section. The design of flue baffle 94 and heat exchange shell 12 is such that the baffle extends down just far enough into inlet 30 at the top of the convoluted heat exchange section to equally divide the ascending flue gases and offer the minimum amount of restriction to flue gas flow. By dividing the flue gases into two equal streams, the turbulence in the collector duct is reduced to a minimum, thereby minimizing the energy losses in this section.

During operation of the air heater of this invention, gas is supplied through manifold pipe 57 to burners 36 ignited by the flame carryover tube 68 supplied through pilot line 59. Primary air is inducted directly into the burners. Secondary air is inducted into combustion chambers 20 and burned with the gas-air mixture emanating from the burners. Hot products of combustion flow upwardly through each heat exchange shell by entering vertical passage 29 of convoluted heat exchange section 24 through outlet opening 22. As these gases ascend through the heat exchange section, heat is extracted by the air passing upwardly between adjacent heat exchange shells from blower 14. The cooling of ascending flue gases would ordinarily reduce the velocity of the gases relative to the walls of the heat exchanger. However, the tapered vertical passage 29 avoids this usual heat loss by averaging the velocity of the ascending gases through the passage. Flue baffle 94 provides balanced flow across heat exchange section 24 and splits the flow of combustion gases into duct 28 to increase heat transfer from the gases to the walls of the shell and thus to the air passing adjacent thereto. The combustion products in collector duct 28 exit through outlet 34 into collection chamber 35 with the aid of a draft created between draft diverter 78 and draft diverter baffle 80. These gases are ultimately discharged through stack 16 with relatively minimal heat losses.

What is claimed is:

1. A heat exchange shell capable of use in a furnace comprising:
   a. a substantially horizontal combustion chamber adapted to receive a relatively long burner and having a relatively long and narrow opening along its top for the passage of products of combustion;
   b. a heat exchange section integral with the combustion chamber formed of walls extending upwardly from the combustion chamber's opening, the walls defining a passage which is in gas communication with the combustion chamber's opening and which presents a relatively long and narrow bounding periphery to products of combustion ascending therethrough;

c. a substantially horizontal collector duct integral with and above the heat exchange section having an outlet at one end and a relatively long and narrow inlet in gas communication with the heat exchange section's passage; and d. a substantially horizontal, elongated baffle in the collector duct, the baffle extending lengthwise along the collector duct inlet and disposed substantially centrally with reference thereto, the baffle including a pair of elongated gas-diverting members diverging upwardly into the collector duct, and an elongated gas-flow-dividing fin below the gas-diverting members, the gas-diverting members and the fin being operable to effect uniform flow of ascending products of combustion in the heat exchange section along its length and into the collector duct and to divert ascending products of combustion along the interior walls of the collector duct.

2. The heat exchange shell claimed in claim 1 wherein each of the gas-diverting members is substantially flat.

3. The heat exchange shell claimed in claim 2 wherein the gas-flowing-dividing fin is substantially flat.

4. The heat exchange shell claimed in claim 1 wherein the gas-flow-dividing fin extends into the top of the heat exchange section.

5. The heat exchange shell claimed in claim 1 including a plurality of spaced-apart tabs extending laterally outwardly from the gas-diverting members and abutting against the interior walls of the collector duct to provide longitudinal support means for the baffle means, whereby the baffle means is spaced away from the interior walls of the duct to allow passage of the products of combustion along its length into the duct.

6. The heat exchange shell claimed in claim 1 including an indexing tab extending laterally from the front of each gas-diverting member exterior of the collector duct outlet, the tabs being secured to the front of the heat exchange shell to provide rigid support means for the baffle means.

7. A heat exchange shell for use in a furnace comprising;

a. a combustion chamber which, in depth is long relative to its width, has an opening extending substantially the length of the combustion chamber for the discharge of products of combustion, and is adapted to receive a long and narrow burner;

b. a heat exchanger section extending above and from the combustion chamber and having a long and narrow passage in communication with the opening in the combustion chamber, the passage being defined by serpentine walls each of which has at least two convolutions in mating relationship with the convolutions of the outer wall, the depth of the convolutions and the width of the passage being such that a plane extending the height of the passage and disposed in the passage is not intercepted by the walls, the walls being joined together along their front and rear edges by seams which follows the convolutions;

c. a collector duct for receiving products of combustion from the heat exchange passage, the collector duct having a long and narrow inlet in communication with the upper end of the heat exchange passage and an outlet for the discharge of products of combustion from the shell; and d. baffle means in the collector duct extending substantially the length of the collector duct's inlet for diverting products of combustion along the walls of the collector duct.

8. The heat exchange shell claimed in claim 7 wherein where the serpentine walls meet the combustion chamber the curvature of one of the walls is such that it sees the combustion chamber and this wall is bowed outwardly sufficiently to avoid substantial contact with products of combustion passing through the opening in the combustion chamber by preventing such wall from moving inwardly into the path of such products of combustion because of the heating of the heat exchange section.

9. The heat exchange shell claimed in claim 8 wherein the walls of the heat exchange section are gradually tapered toward one another so that the serpentine heat exchange section passage gradually decreases in cross-sectioned area toward the collector duct.

10. The heat exchange shell claimed in claim 8 wherein the shell is fabricated from sheet metal complementary half-shells each having a peripheral rim secured to the peripheral rim of the other to provide a unitary structure with a seam spanning its entire outer periphery.

11. A hot air furnace comprising:

a. a casing;

b. a plurality of side by side heat exchange shells in the casing, each heat exchange shell including:

i. a substantially horizontal combustion chamber having a relatively long and narrow opening along its top;

ii. a heat exchange section integral with the combustion chamber formed of spaced apart serpentine walls extending upwardly from the combustion chamber's opening, each of the spaced apart walls having at least two convolutions in mating relationship with the convolutions of the other wall to define a long and narrow serpentine heat exchange passage which is in gas communication with the combustion chamber's opening for substantially the entire extent of such opening, the depth of the convolutions and the width of the passage being such that a plane extending the height of the passage and disposed in the passage is not intercepted by the walls, the walls being joined together along their front and rear edges by seams which follow the curvature of the convolutions;

iii. a substantially horizontal collector duct integral with and above the heat exchange section having an outlet at one end and a relatively long and narrow inlet in gas communication with the heat exchange section's passage; and iv. substantially horizontal, elongated baffle means extending lengthwise along the collector duct inlet and disposed substantially centrally with reference thereto to effect uniform flow of ascending products of combustion in the heat exchange section and into the collector duct, the baffle means having means to divert ascending products of combustion along the interior walls of the collector duct;

c. burner means in each combustion chamber;

d. blower means for directing air over the heat exchange shell's outer surfaces; and e. vertical expansions for each of the heat exchange shells between the collector ducts and the casing.

12. The furnace claimed in claim 11 wherein:

a. the casing includes a substantially vertical faceplate mounted transverse to the casing's sidewalls inwardly of the front of the furnace;

b. the collector duct outlet and combustion chamber of each heat exchange shell extend forward of their heat exchange section toward the front of the furnace with the extension of the combustion chamber opening in a substantially vertical plane; and c. each heat exchange shell is vertically mounted in and rearwardly of the faceplate, with the combustion chamber and collector duct extensions projecting through the plate toward the front of the furnace.

13. The furnace claimed in claim 12 wherein the expansion means includes:

a. a floating collar plate in which is disposed the collector duct extensions;

b. insulation means between the collar plate and the faceplate; and c. fastener means securing the collar plate and the the faceplate together such that relative vertical movement between the secured members is possible.

14. The furnace claimed in claim 11 including air-diverting means on the interior wall of the casing facing an adjacent one of the heat exchange shells and positioned to force upwardly ascending air close to the exterior surface of the heat exchange section of such heat exchange shell at least where such exterior surface is relatively far from the casing interior wall.

15. The furnace claimed in claim 11 wherein each of the shells has one of the walls of the heat exchange section adjacent the combustion chamber which faces the combustion chamber and which is bowed outwardly sufficiently to prevent such wall from moving into the path of products of combustion when the heat exchange section is heated and to thereby avoid substantial contact with products of combustion passing from the combustion chamber.

16. The furnace claimed in claim 15 wherein each of the shells is fabricated from half shells of sheet metal with each half shell having a peripheral rim secured to the peripheral rim of its complementary half shell to provide a unitary structure with a seam around its entire outer periphery.

17. The furnace claimed in claim 11 wherein each of the heat exchange shell's baffle means includes a pair of elongated gas-diverting members diverging upwardly from a line of meeting of such members proximate the collector duct inlet in the middle of such inlet, and a flow-dividing fin depending from the gas-diverting members into the heat exchange passage to divide the flow from such passage substantially equally past the gas-diverting members and along the walls of the collector duct.

* * * * *

PO-1050
(5/69)

UNITED STATES PATENT OFFICE
CERTIFICATE OF CORRECTION

Patent No. 3,638,636          Dated    February 1, 1972

Inventor(s) William A. Marshall, Bernard Paul Lunkwicz and Henry Meres

It is certified that error appears in the above-identified patent and that said Letters Patent are hereby corrected as shown below:

In the specification: Column 1, line 28 "exchanges" should be --exchangers--; line 55 "exchange" should be --exchanger--; line 64 after "ample" the comma should be a period; line 72 "surpentine" should be --serpentine--. Column 2, line 13 "convolution" should be --convolutions--; line 22 "products" should be --produces--; line 36 "Division" should be --Diversion--. Column 3, delete lines 60 through 67. Column 4, line 15 "chamber" should be --chambers--; line 40 "during" should be --along--. Column 5, line 40 "substantial" should be --combustion--. Column 6, line 9 "flanges" should be --flange--.

In the claims: Claim 3, column 7, line 26 "gas-flowing" should be --gas flow--. Claim 5, column 7, line 31 "outwardly" should be --outward--. Claim 7, column 7, line 50 "exchanger" should be --exchange--; line 55 "outer" should be --other--. Claim 13, column 9, line 1, delete "the" at end of line.

Signed and sealed this 30th day of January 1973.

(SEAL)
Attest:

EDWARD M. FLETCHER, JR.          ROBERT GOTTSCHALK
Attesting Officer                  Commissioner of Patents